United States Patent [19] [11] Patent Number: 6,139,259
Ho et al. [45] Date of Patent: Oct. 31, 2000

[54] LOW NOISE PERMEABLE AIRFOIL

[75] Inventors: Patrick Y. Ho, Cincinnati; Philip R. Gliebe, Waynesville, both of Ohio

[73] Assignee: General Electric Company, Cincinnati, Ohio

[21] Appl. No.: 09/181,904

[22] Filed: Oct. 29, 1998

[51] Int. Cl.[7] .................................................. F01D 25/04
[52] U.S. Cl. ..................... 415/119; 415/208.001
[58] Field of Search ................................. 415/119, 115, 415/208.1, 209.1, 142; 416/224, 229 A, 230, 500; 244/1 N, 209

[56] References Cited

U.S. PATENT DOCUMENTS

| | | |
|---|---|---|
| 2,340,417 | 2/1944 | Ellett ................................ 416/231 R |
| 3,316,714 | 5/1967 | Smith et al. ......................... 415/191 |
| 5,169,288 | 12/1992 | Gliebe et al. ........................ 415/119 |
| 5,272,869 | 12/1993 | Dawson et al. ...................... 415/142 |
| 5,613,649 | 3/1997 | Schlinker et al. .................... 244/1 N |

FOREIGN PATENT DOCUMENTS 2026622  2/1980  United Kingdom .

*Primary Examiner*—Edward K. Look
*Assistant Examiner*—Richard Woo
*Attorney, Agent, or Firm*—Andrew C. Hess; Nathan D. Herkamp

[57] ABSTRACT

A stator airfoil is subject to wake fluid from rotor blades in a gas turbine engine. The airfoil includes a plurality of cross channels extending therethrough between opposite sides thereof for bleeding the wake fluid therebetween to reduce differential pressure thereacross and reduce noise.

20 Claims, 3 Drawing Sheets

LOW NOISE PERMEABLE AIRFOIL

BACKGROUND OF THE INVENTION

The present invention relates generally to gas turbine engines, and, more specifically, to noise reduction therein.

In an aircraft turbofan gas turbine engine, air is compressed, mixed with fuel, and ignited for generating hot combustion gases which flow downstream through turbine stages and are discharged as a jet with corresponding thrust. The turbines power a compressor, and also power a fan which produces a majority of the propulsion thrust for powering an aircraft in flight.

The propulsion air and jet exhaust are two sources of engine noise. The reduction thereof is an environmental objective and is typically accomplished using various techniques including higher bypass ratio turbofans, acoustic liners inside the engine ducts and fan nacelle, and exhaust mixers.

A principal source of fan noise is the interaction between the fan rotor blades and stator vanes or struts downstream therefrom. The fan has a rotational speed N and effects a blade passing frequency (BPF) which is the product of the rotational speed N and the number B of rotor blades. The fan air generates spinning mode noise produced by rotating pressure fields and wakes caused by the rotor blade, and the interaction thereof with the adjacent stator vanes. This noise is emitted from the engine both upstream through the inlet of the fan duct and downstream through the duct outlet.

The spinning mode noise occurs at discrete frequencies including the fundamental blade passing frequency BPF, which is also a first harmonic, and higher order frequencies or harmonics thereof.

In order to ensure the decay of spinning mode noise, it is known to select the number of vanes to be greater than or equal to twice the product of the number of blades and the blade passing frequency harmonic number. For example, decay of the first harmonic spinning mode noise may be achieved using a number of vanes greater than or equal to twice the number of blades. Higher harmonic noise decay requires even a greater number of vanes which is impractical to implement in a turbofan engine.

Notwithstanding the various techniques available for reducing fan and jet noise in a turbofan engine, residual noise is still significant.

Accordingly, it is desired to further reduce fan and jet noise in an improved manner.

BRIEF SUMMARY OF THE INVENTION

A stator airfoil is subject to wake fluid from rotor blades in a gas turbine engine. The airfoil includes a plurality of cross channels extending therethrough between opposite sides thereof for bleeding the wake fluid therebetween to reduce differential pressure thereacross and reduce noise.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
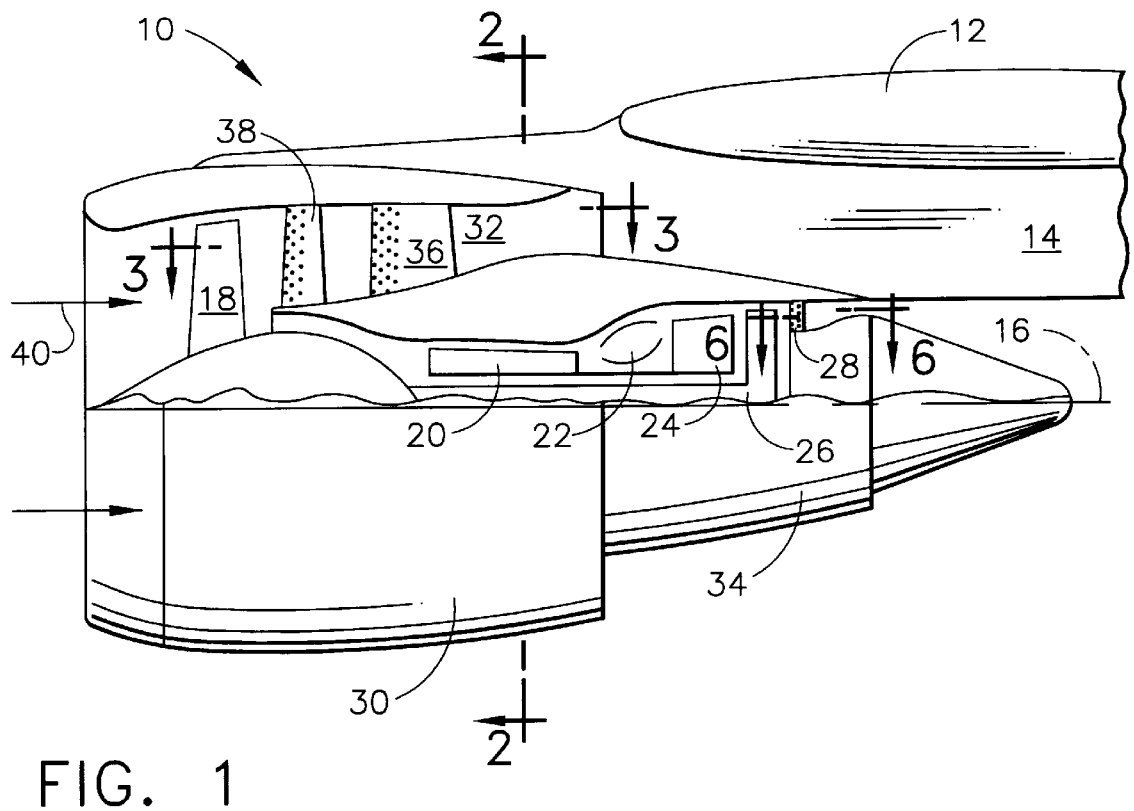
FIG. 1 is a partly sectional, schematic representation of an exemplary pylon-mounted high bypass turbofan gas turbine engine having airfoils in accordance with exemplary embodiments of the present invention for reducing noise.

Illustrated in FIG. 1 is an exemplary gas turbine engine 10, such as a high bypass turbofan engine, effective for powering an aircraft in flight. The engine may be mounted to an aircraft wing 12 by a pylon 14.

The engine is axisymmetrical about a longitudinal or axial centerline axis 16 and includes in serial flow communication a fan having a plurality of circumferentially spaced apart fan rotor blades 18, a multistage axial compressor 20, an annular combustor 22, a high pressure turbine 24, a low pressure turbine including rotor blades 26, and a turbine rear frame having a plurality of circumferentially spaced apart rear struts 28.

Figure 2:
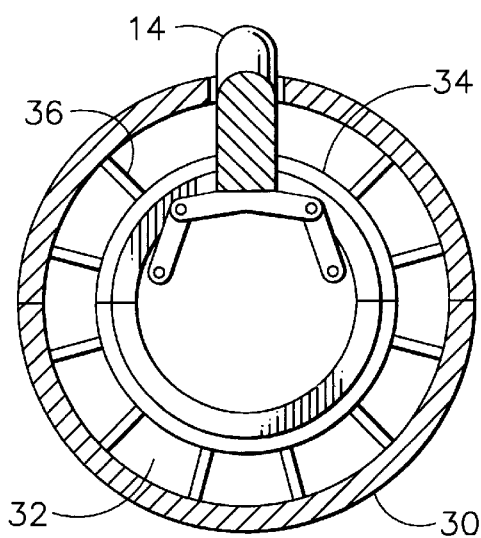
FIG. 2 is an elevational, partly sectional view through the fan duct illustrated in FIG. 1 and taken generally along line 2—2.

The fan blades 18 are disposed inside a fan nacelle 30 in a fan duct 32 defined between the inner surface of the nacelle 30 and the outer surface of a core engine casing or nacelle 34. The fan nacelle 30 is mounted to the casing 34 by a plurality of circumferentially spaced apart fan struts 36, also shown in FIG. 2. Disposed downstream from the fan blades 18 and upstream from the struts 36 is a row of outlet guide vanes 38 configured for deswirling air 40 being pressurized by the fan blades. The struts 36 and outlet guide vanes 38 are fixedly mounted at their opposite radial ends to the fan nacelle 30 and the casing 34.

Figure 3:
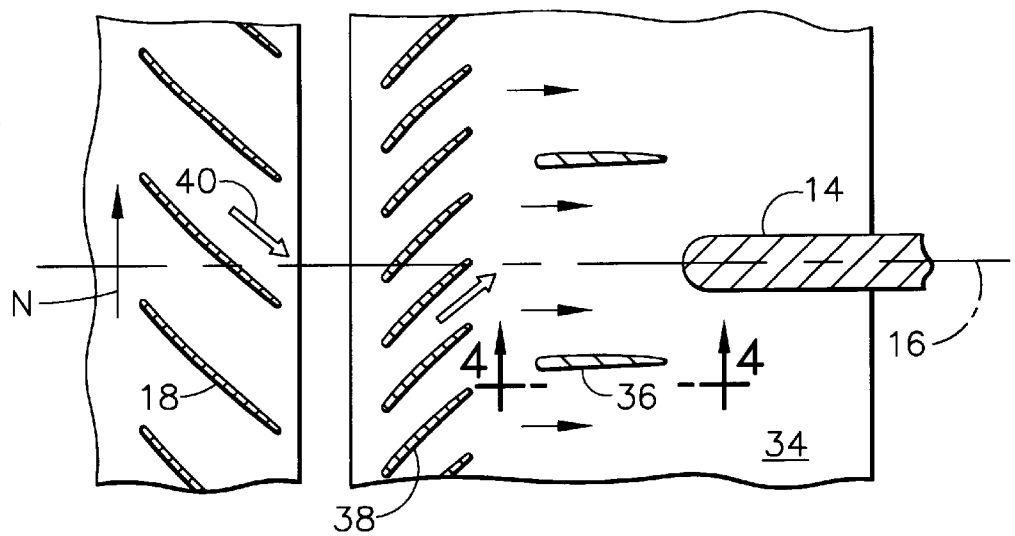
FIG. 3 is a planiform view of a portion of the fan duct illustrated in FIG. 1 and taken along line 3—3.

During operation, the fan blades 18 rotate on a disk powered by the lower pressure turbine blades 26 to pressurize the air 40 and produce propulsion thrust from the outlet end of the fan duct 32. As shown in FIG. 3, the number V of outlet guide vanes 38 is preferably greater than or equal to twice the number B of fan blades 18 to ensure decay of the spinning mode noise for the first fundamental harmonic, and higher harmonics as desired.

Since the fan blades 18 swirl the air 40, the outlet guide vanes 38 are configured for deswirling the fan air into a generally axial direction downstream between the fan struts 36. The fan struts typically have long chords and are also relatively few in number, i.e., less than the number of fan blades 18, for providing the structural support to mount the fan nacelle 30 to the casing 34. The struts are also aerodynamically streamlined to reduce pressure losses therefrom.

The product of the number B of fan blades 18 and the rotational speed N thereof defines the fundamental blade passing frequency BPF. The rotating fan blades produce periodic rotating pressure field wakes which engage the outlet guide vanes 38 and the fan struts 36 with corresponding generation of noise. Attenuation or suppression of the noise generated within the fan duct is limited by conventional techniques including the preferred number of blades and vanes, and lining the fan duct with acoustic material.

Although it is known that the periodic wakes from the fan blades 18 interact with the vanes 38 and the struts 36 to produce noise, a specific cause thereof has been recently discovered in accordance with the present invention which may be used to effect a corresponding structural improvement in the fan assembly for further reducing such fan noise.

More specifically, the fan struts 36 and outlet guide vanes 38 illustrated in FIG. 3 are different forms of airfoils having different functions in channeling the fan air thereover. The outlet guide vanes 38 have concave and convex opposite sides and are cambered for deswirling the fan air 40 from the fan blades 18. The fan struts 36 have generally symmetrical opposite sides and are streamlined to minimize flow obstruction while supporting the fan nacelle. The vanes and struts are typically designed for operation at one design point, such as cruise, for optimum aerodynamic performance, with off-design point performance thereof being different. And, the fan struts 36 directly adjacent the pylon 14 are typically cambered or oriented differently from the remainder of the struts to improve the aerodynamic performance of the fan air discharged along the pylon 14.

The principle underlying the present invention is based on the generation of discrete tone noise by a lifting body, such as a flat plate or an airfoil, with an unsteady-state lifting force. Both the fan struts 36 and vanes 38 experience steady state lift and drag forces at their design points as well as at off-design points. And, they are also subject to unsteady-state lifting forces from exposure to the fan air 40 which flows downstream thereover with periodic wakes at the blade passing frequency.

Although the outlet guide vanes 38 deswirl the blade wakes, the periodic wakes are nevertheless carried downstream past the fan struts 36. Unsteady-state lifting force from the rotating wakes is superimposed with additional unsteady-state lifting forces from the outlet guide vanes 38 and transported to the fan struts 36. At off-design conditions, the fan struts 36 are further subject to a change in angle of attack due to incomplete deswirling of the rotor wakes by the outlet guide vanes.

The net effect of this operation causes the fan struts 36 to be aerodynamically loaded and become acoustical noise sources.

In accordance with the present invention, it has been discovered that modifying the otherwise conventional fan struts 36 to reduce the unsteady-state lifting forces thereon will correspondingly reduce noise generated therefrom. Furthermore, this discovery has additional applications for other stator airfoils which produce noise from periodic wakes thereover such as the outlet guide vanes 38 and the turbine rear frame struts 28 for example. These components may be otherwise conventional in configuration and function but may be modified in accordance with the present invention for reducing noise therefrom.

The basic objective of the present invention is to reduce or eliminate the unsteady pressure fluctuations between opposite sides of a stator airfoil caused by the periodic passing of rotor blade wakes.

Figure 4:
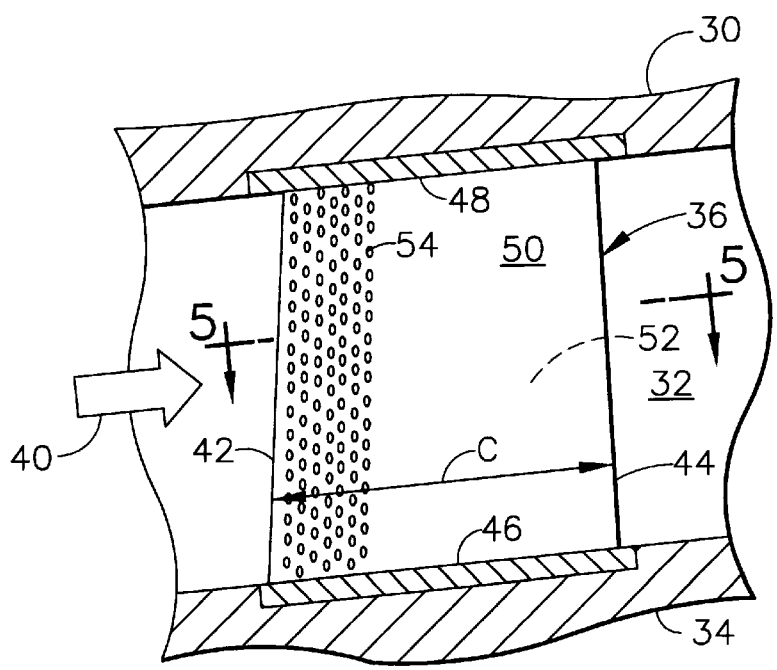
FIG. 4 is a elevational, side view of one of the fan struts illustrated in FIG. 3 and taken along line 4—4.

As one example, FIG. 4 illustrates one of the fan struts 36 modified in accordance with a preferred embodiment of the present invention. As indicated above, the strut 36 is subject to periodic pressure fluctuations in the wake fluid 40 from the upstream fan blades. Each fan strut 36 includes a leading edge 42, an axially opposite trailing edge 44, a radially inner root 46, an opposite radially outer tip 48, and circumferentially opposite first and second sides 50,52 extending therebetween. The strut roots 46 are fixedly attached in an annular inner band supported in the casing 34, and the strut tips 48 are similarly fixedly attached to annular outer band in the fan nacelle 30. The struts 36 provide a structural load bearing path for supporting the fan nacelle 30 to the engine casing 34.

Figure 5:
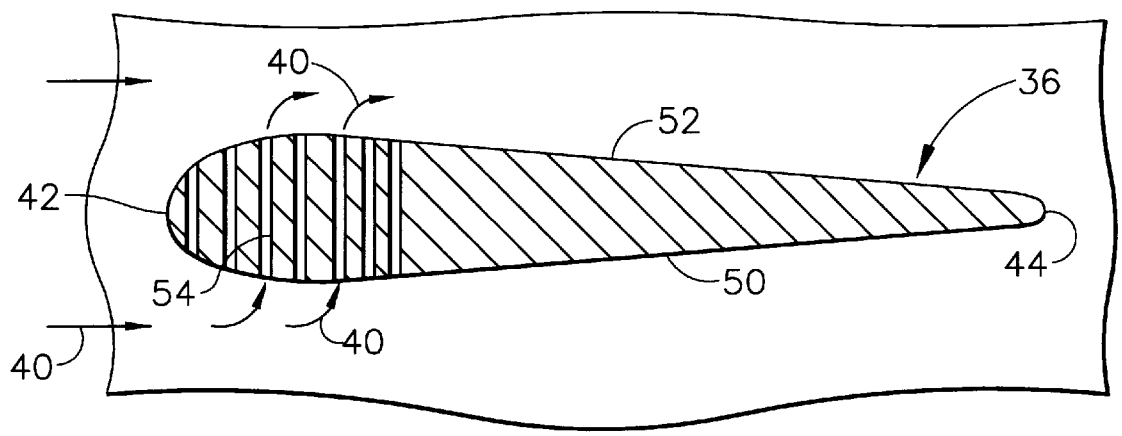
FIG. 5 is radial sectional view through the fan strut illustrated in FIG. 4 and taken along line 5—5.

As additionally shown in FIG. 5, the fan struts 36 are preferably aerodynamically streamlined in a generally symmetrical tear drop shape for minimizing flow obstruction. Nevertheless, due to the periodic rotating pressure field from the wake fluid 40, a differential static pressure is induced circumferentially across the fan struts 36, particularly at off-design conditions, and typically with greater magnitude for those struts adjacent the supporting pylon 14.

In accordance with the present invention, noise may be reduced from the wake fluid interaction between the fan blades 18 and the struts 36 by channelling or bleeding the wake fluid circumferentially through the individual struts 36 between the first and second sides 50,52 thereof to reduce differential static pressure therebetween. By reducing the unsteady-state differential pressure across the struts, a corresponding reduction in noise generation may be effected.

In the exemplary embodiment illustrated in FIGS. 4 and 5, the individual fan struts 36 are made permeable by introducing a plurality of cross-flow channels 54 extending circumferentially through the strut from the first side 50 to the second side 52 for channeling or bleeding the wake fluid 40 therebetween during operation to reduce differential static pressure thereacross. The individual cross channels 54 include apertures at opposite ends thereof which are disposed flush in the opposite strut sides 50,52 for providing respective flow channels to allow respective portions of the wake fluid 40 to pass circumferentially through the individual struts in response to differential pressure therebetween. Since the wake fluid includes periodic unsteady-state differential pressures. The cross channels 54 relieve those differential pressures in either direction across the individual fan struts 36 as required.

In the exemplary embodiment illustrated in FIGS. 3–5, the fan struts 36 are disposed downstream from the fan blades 18 from which they receive the periodic wakes, and the cross channels 54 provide direct channels through the opposite circumferential sides of the struts for bleeding the wake fluid through the strut for reducing the differential pressure thereacross and correspondingly reducing the wake-induced noise therefrom. In the exemplary embodiment illustrated in FIG. 5, the struts 36 are solid from their roots to tips circumferentially between the two sides 50,52 thereof, with the cross channels 54 extending independently therethrough, by being individually laser drilled for example.

Since the wake fluid 40 first engages the individual struts 36 at the leading edges 42 thereof, the cross channels 54 are preferably disposed adjacent the leading edges for first receiving the wake fluid and reducing the differential pressure thereof between the two sides 50,52. In this way, wake fluid may be bled between the strut sides solely along the leading edges for maximum effect without introducing discontinuities in the structural struts 36 downstream therefrom.

More specifically, the individual struts 36 illustrated in FIG. 4 have a chord length C between the leading and trailing edges which may vary from the root to tip of the struts. The cross channels 54 are preferably disposed solely adjacent the leading edge 42 in a portion or a part of the chord up to about one quarter chord from the leading edge for example. This provides porosity solely near the leading edges of the struts, and the strut sides 50,52 are otherwise imperforate downstream therefrom in the remainder of the chord length, such as three quarters chord from the trailing edges 44.

The cross channels 54 are preferably spaced apart both radially between the root 46 and the tip 48 and axially between the leading and trailing edges 42,44 as shown in FIG. 4 in a substantially uniform pattern to distribute the differential pressure reduction generally uniformly across the leading edges of the struts. The inlet and outlet hole patterns of the cross channels 54 on opposite sides of the struts may be varied to optimize their ability to effectively reduce the differential static pressure across the struts, and noise therefrom.

For example, the wake fields from the tips of the fan blades 18 may effect a greater amount of differential pressure, and correspondingly the cross channels 54 should be concentrated near the tips 48 of the individual struts. Similarly, the cross channels 54 may be concentrated near mid-span or near the roots 46 of the struts as desired.

Furthermore, the cross channels 54 may be preferentially sized in diameter and length to maximize noise attenuation without adversely affecting the normal aerodynamic performance of the struts and their structural load carrying capability. For example, the cross channels 54 may be sized in diameter to reduce the unsteady-state differential static pressure in the wake fluid 40 between the two sides 50,52 to a greater extent than the steady state differential static pressure therein. In this regard, the cross channels may have an inner diameter in the exemplary range of 50–100 mils.

Since the primary objective of the cross channels 54 is to bleed the wake fluid between the opposite sides of the struts to reduce the unsteady-state lifting forces thereacross and reduce noise associated therewith, they may have various suitable configurations. In FIG. 5, the cross channels 54 are simple, straight drilled holes extending circumferentially through the individual struts 36 near the leading edges 42 thereof. The length-to-diameter ratio of the individual cross channels 54 may be selected for controlling the pressure impedance therethrough for maximizing noise attenuation without adversely affecting aerodynamic performance of the struts. The cross channels 54 may have identical inner diameters, or the diameters may vary from hole to hole as desired. The patterns for the end holes of the cross channels 54 on the opposite sides 50,52 may be selected as desired for also maximizing noise attenuation.

Although the invention has been disclosed with respect to FIGS. 4 and 5 for a specific embodiment for the fan struts 36 disposed downstream of the fan blades 18, it may have additional utility wherever stator airfoils interact with rotating pressure fields from upstream rotor blades.

For example, the invention may also be applied to the outlet guide vanes 38 illustrated in FIGS. 1 and 3. Like the fan struts 36, the outlet guide vanes 38 extend radially between the fan nacelle and the engine casing 34 downstream of the fan blades 18 and are first to receive the wake fluid therefrom. Although the primary function of the outlet guide vanes 38 is to deswirl the fan air, the cross channels 54 may be added thereto along the leading edge thereof in a substantially identical manner to that illustrated in the strut embodiment illustrated in FIGS. 4 and 5. In deswirling the fan air, the opposite sides of the vanes 38 typically define a convex suction side and concave pressure side with attendant steady state lift thereacross. The cross channels 54 may be introduced to reduce the unsteady-state differential static pressure thereacross without adversely decreasing the steady state differential pressure required for deswirling operation.

Furthermore, some turbofan designs combine the functions of the outlet guide vanes and struts in one common outlet guide vane/strut without separate rows thereof. These types of combined airfoils are effective for both deswirling the fan air as well as structurally supporting the fan nacelle to the engine casing. The cross channels 54 may also be introduced in such combined airfoils for attenuating noise without adversely affecting the aerodynamic or structural performance of the airfoils.

Figure 6:
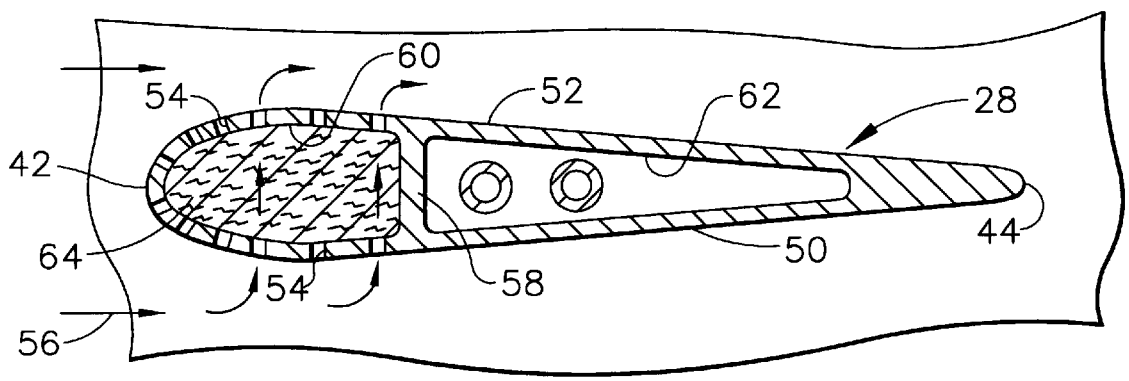
FIG. 6 is a radial sectional view through a strut of the turbine rear frame illustrated in FIG. 1 and taken along line 6—6.

As illustrated in FIGS. 1 and 6, the invention may also be applied to the turbine rear frame struts 28 which are disposed downstream from the low pressure turbine blades 26 between which flows hot combustion gases 56 generated in the combustor 22. The combustion gases 56 also include wakes generated by the turbine blades 26 having rotating pressure fields which interact with the rear struts 28 as a source of turbine exhaust noise.

An exemplary one of the rear struts 28 is illustrated in more detail in FIG. 6 and is typically hollow from its root to tip. Like the fan struts 36 illustrated in FIG. 4, the turbine rear frame struts 28 similarly include a leading edge 42, a trailing edge 44, an opposite sides 50,52 using the same numerals as those found for the fan struts illustrated in FIG. 4 in view of the general similarity in airfoil configuration.

The cross channels 54 may be in the form of drilled holes through the walls of the rear struts 28 providing a flowpath for bleeding and relieving differential pressure between the strut sides. Since the cross channels 54 are preferably disposed near the leading edges 42, the rear struts 28 may also include an integral radial septum 58 which defines forward and aft chambers 60,62 to fluidly separate the cross channels 54 in the forward chamber 60 from the aft chamber 62.

In this embodiment, the cross channels 54 are simple holes drilled through the walls of the rear struts 28 which communicate with the common forward chamber 60 and collectively define flowpaths between the opposite sides 50,52 of the strut for bleeding the combustion gas 56 thereacross. The separate aft chamber 62 may be used for carrying air or lubrication utility conduits radially through the combustion flowpath.

Since the forward chamber 60 is hollow, and joins the opposite cross channels 54 in common flow communication, it may include an acoustic damping fiber 64 in wool form therein for reducing any secondary noise affects associated therewith. The primary purpose of the cross channels 54 is to provide a direct flowpath between the opposite sides of the strut 28 near the leading edge 42 thereof, with the acoustic fiber 64 being secondary.

As indicated above, the discovery of the differential aerodynamic pressure loading of stator airfoils from the rotating pressure fields of upstream rotor blades as an acoustical noise source has led to a relatively simple solution in the introduction of the cross channels 54 for reducing those differential pressures. The permeable airfoils of the present invention include relatively small cross channels 54 effective for reducing the unsteady differential static pressure across the airfoils for reducing noise without otherwise adversely affecting the aerodynamic or structural capability of the airfoils whether they are in the form of the fan struts 36, outlet guide vanes 38, or turbine rear frame struts 28. The invention may also be applied in other applications where desired for reducing rotor wake induced noise on stator airfoils.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A stator airfoil subject to wake fluid from rotor blades in a gas turbine engine comprising:

a leading edge, an opposite trailing edge, an inner root, an opposite outer tip, and opposite first and second sides extending therebetween; and a plurality of cross channels extending through said airfoil from said first side to said second side for bleeding said wake fluid therebetween to reduce differential pressure thereacross.

2. An airfoil according to claim 1 wherein said cross channels are disposed adjacent said leading edge for first receiving said wake fluid and reducing differential pressure thereof between said first and second sides.

3. An airfoil according to claim 2 wherein said cross channels are spaced apart both radially between said root and tip and axially between said leading and trailing edges in a pattern to distribute said differential pressure reduction thereacross.

4. An airfoil according to claim 3 wherein said cross channels are disposed solely adjacent said leading edge, and said first and second sides are otherwise imperforate.

5. An airfoil according to claim 3 being solid from said root to said tip between said first and second sides, with said cross channels extending therethrough.

6. An airfoil according to claim 3 being hollow from said root to said tip, and including a septum defining forward and aft chambers to fluidly separate said cross channels in said forward chamber from said aft chamber.

7. An airfoil according to claim 6 further comprising an acoustic damping fiber inside said forward chamber.

8. An airfoil according to claim 3 wherein said cross channels are sized in diameter to reduce unsteady-state differential pressure in said wake fluid between said first and second sides to a greater extent than steady state differential pressure therein.

9. An airfoil according to claim 3 in the form of a fan strut disposed in combination with a row of fan blades upstream therefrom for reducing fan noise.

10. An airfoil according to claim 3 in the form of a fan outlet guide vane disposed in combination with a row of fan blades upstream therefrom for reducing fan noise.

11. An airfoil according to claim 3 in the form of a turbine rear frame strut disposed in combination with a row of turbine blades upstream therefrom for reducing turbine exhaust noise.

12. A method of reducing noise from wake fluid interaction between a row of rotor blades and row of stator airfoils comprising bleeding said wake fluid circumferentially through said airfoils from a first side thereof to an opposite second side to reduce differential pressure therebetween.

13. A method according to claim 12 further comprising bleeding said wake fluid solely adjacent a leading edge of said airfoils.

14. A method according to claim 12 further comprising bleeding said wake fluid to reduce unsteady-state differential pressure in said wake fluid between said first and second sides to a greater extent than steady state differential pressure therein.

15. A method according to claim 12 further comprising bleeding said wake fluid through a fan strut disposed downstream of a fan blade in a gas turbine engine to reduce fan noise.

16. A method according to claim 12 further comprising bleeding said wake fluid through a fan outlet guide vane disposed downstream of a fan blade in a gas turbine engine to reduce fan noise.

17. A method according to claim 12 further comprising bleeding said wake fluid through a turbine rear frame strut disposed downstream of a turbine blade in a gas turbine engine to reduce turbine exhaust noise.

18. A stator airfoil including cross channels extending between opposite sides thereof for bleeding external fluid across said opposite sides to reduce differential pressure.

19. A stator airfoil comprising:

opposite first and second sides extending between opposite leading and trailing edges; and a plurality of cross channels extending between said opposite sides for bleeding external fluid from said first side to said second side to reduce differential pressure thereacross.

20. An airfoil according to claim 19 wherein said cross channels are disposed solely adjacent said leading edge, and are sized in diameter to reduce unsteady-state differential pressure in said fluid between said first and second sides to a greater extent than steady state differential pressure therein.

* * * * *